3,346,401
PROCESSING OF RAW INTESTINES
Sisir Kumar Barat, Adyar, Madras, India, assignor to Council of Scientific and Industrial Research, New Delhi, India, a corporation of India
No Drawing. Filed Apr. 15, 1964, Ser. No. 360,092
2 Claims. (Cl. 99—175)

This invention relates to the processing of mammalian intestines.

Intestines of cattle, goat, sheep, pig and other mammalian animals are obtained in considerable quantities from the slaughter houses. In certain places, they are sold to the poorer sections of the population for edible purposes, but, in most cases they are wasted. Intestines, being of biological origin are highly susceptible to degradation, particularly in the moist form, and may undergo considerable deterioration even in the wet-salted condition in which state they are mostly being preserved and exported at present. Under suitable conditions, however, these constitute an important raw material for the manufacture of sausage casings or absorbable type of surgical suture and sports gut, all of which have a great export potentiality.

Intestines not found to be biologically suitable for the manufacture of surgical suture and sausage casing can be used for the manufacture of high class sports gut for various purposes for which there is a considerable demand both within the country and abroad.

The methods of preliminary cleansing and processing of the raw material for the manufacture of the three items, namely, surgical suture, sausage casing and sports gut, are more or less similar to one another. Although India has a vast export potentiality in these commodities, none of the product are, at the moment being manufactured in a systematic and organized way of producing standard goods. Most of these materials are being exported in the raw and semi-cured states through primitive methods entailing considerable deterioration of the stock.

At present, most of the intestines are mechanically cleansed, washed and preserved in wet salted condition and exported as such. Some, particularly those from the cattle are blown and dried after being cleansed. On reaching their destination, they are stored as such till they are used in the sausage factory for filling, when they are soaked back and washed free of the salt.

The draw-backs of the hitherto known process are:

(a) Lack of proper cleaning, as a result of which, the goods look unsightly and the residual fatty matters often go rancid and mouldy and emit an unpleasant smell.

(b) Being wet, most of the goods have a limited storage life and are susceptible to fungus attack; those dried become brittle, lacking in softness and pliability and turn yellowish in colour, being equally liable to attacks by micro-organisms.

(c) In wet-salted condition, the goods present considerable difficulty in handling and packing and prove quite expensive for "air freight"—the usual mode of despatch.

(d) The goods are not amenable to printing or other decorations.

(e) The goods cannot be obtained in a guaranteed hygienic and sterilized condition.

(f) Spots of slime or dirt cannot be traced in salted casings until after filling.

The main object of the present invention is to eliminate the above mentioned disadvantages and to obtain goods which, besides being usable as sausage casings, can also be utilised as stock for the preparation of surgical suture, sports gut, musical strings and like purposes.

Another object of this invention is to obtain the goods in an absolutely clean, dry, and ready-to-use condition with a fine, glossy water-white shade, instantly soakable to their natural soft and flaccid condition with all their original gloss and bloom.

A further object is to obtain goods which, besides being amenable to printing and other decorations in conformity with the trade requirements and to sterilization, if necessary, can be suitably packed and preserved indefinitely without becoming rancid or mouldy and without suffering any further deterioration, affording easy handling and packing with a considerable saving in freight.

Yet another object is to evolve a process by which rigorous quality control on a scientific basis may be effected and any possible spots of slime or dirt can be detected and eliminated in time before filling the intestines.

According to the present invention, the draw-backs of wet-salted mammalian intestines are totally eliminated by processing the said goods to a dry product which would readily soak back to its original soft, flaccid condition on wetting with water.

A novel product, namely, dry, ready-to-wet intestines suitable for use as sausage casing, surgical suture, sports guts or the like can be obtained if the raw intestines, after mechanical treatment (washing and scraping), are subjected to a mild chemical treatment to remove the non-collagenous appendages, leaving behind the collagen-rich sub-mucosa, using in such processing only those simple and harmless chemicals as are permissible under Food Regulations.

The mild chemical treatment consists of cleaning the goods with a detergent in the presence of an alkali, preferably cleaning with soap and soda, such cleaning rendering the goods suitable for subsequent bleaching.

The cleaned product, on being bleached with a bleaching agent in the alkaline range further eliminates impurities and unwanted materials and improves the colour and appearance and renders the product amenable to easy soaking upon drying.

The use of a protected bleaching agent such as hydrogen peroxide along with magnesium sulphate, nonionic sulphated fatty alcohol and an alkali such as sodium hydroxide, sodium carbonate, sodium bicarbonate or the like, protects the goods against undesirable swelling, loss of strength and ultimate dissolution.

Dilute acetic acid treatment of the bleached goods imparts a surprisingly soft, glossy and translucent property and protects the goods from being infested with fungus and moulds.

Subjecting the acid-treated goods to treatment with an oil emulsion, employing a suitable assistant such as glycerine helps in incorporating the optimum amount of oil to render the goods soft, smooth and glossy without oily appearance and ensures natural freshness and bloom on soaking back.

The goods are finished free of all residual chemicals in a perfectly dry form which renders them instantly soakable, bringing them back to their original soft, flaccid condition with all their natural bloom and gloss.

The complete processing according to this invention may be carried out by a series of steps as explained below:

(i) The intestines are carefully removed from the slaughtered animals without punctures, separating the mesenteric attachments and subsequently freeing them, as completely as possible, of the intestinal content, fat, mucosa, muscularis, the serosal layers and other non-collagenous appendages as the case may be through repeated cleaning, stripping and sliming operations either by machine or by hand till the collagen-rich submucosa is obtained.

(ii) The freshly "pulled-off" or soaked gut is washed in several changes of water gently scraping the outside lengthwise with the back of a knife or an edged shell or any other implement with a smooth surface so as to free it from the residual slime, fat, etc., if any. It is then turned inside out and the exposed inner surface also is scraped free of all extraneous matters and thereafter it is washed thoroughly by flushing with tap water at full pressure.

(iii) If the gut already cleansed as above is in the salted condition, it should first be washed free of salts in several changes of water before being subjected to the following treatments:

(a) The cleansed guts are finally and thoroughly washed in three changes of plain water, each washing being continued for at least one hour.

(b) The cleansed and washed guts are next treated in a soap/soda solution consisting of ½% ordinary bar (washing) soap and ½% sodium bicarbonate. The ratio of the solution to the washed guts is about 10:1. This is carried out in two consecutive baths of the same composition, the goods remaining for 4 hrs. in the first and 16 hrs. (overnight) in the second.

(c) The following day, the goods are again washed three times in clean water for a period of three hours and are then put in a good float (1:10 or so) of a protected bleaching bath consisting of 15–20 ml./l. of hydrogen peroxide (100 volume), 10 g./l. of magnesium sulphate and 0.5 g./l. of a nonionic sulphated fatty alcohol of the type Triton X–100, a trademark for iso-octylphenyl polyethoxy ethanol sold by Rohm & Haas Co., the pH of the liquor being adjusted to 9–10 with a suitable alkali like soduim carbonate, sodium bicarbonate or sodium hydroxide as may be necessary, usually 1 g./l. of the alkali being sufficient.

The goods remain in the bath for 1–3 days as required, reinforcing the bath (particularly hydrogen peroxide) if necessary.

(d) The goods are next thoroughly washed in 4–5 changes of clean water and then treated in a dilute acetic acid bath containing 5 ml./l. of glacial acetic acid for 1–10 minutes.

(e) The goods are again washed in three changes of water, after which they are treated for 15 minutes in an emulsion of groundnut oil and glycerine, each being present to the extent of 20 ml./l.

(f) Next, the goods are thoroughly drained and then inflated and dried before being packed suitably.

Much depends on the efficiency of preliminary cleansing and washing of the goods which should be as thorough as possible.

In using the oxidising type of bleaching agents, it is important that a slow rate of evolution of oxygen is ensured through a careful control of pH of the bath.

The duration of treatment at the various stages has to be adjusted according to the nature of the raw material used. The goods, after treatment, are again thoroughly washed free of all chemicals before being finally oiled and dried.

The following examples are given by way of illustration:

EXAMPLE 1

Mechanical cleaning 10 lbs. of the small intestines of cattle (cattle gut) as received from the slaughter house are freed as completely as possible from the intestinal contents fat, mucosa and other non-collagenous appendages through repeated washing and scraping either by machine or by hand till the collagen rich submucose of the intestines is obtained.

The goods (gut) are then soaked in several (at least 3) changes of water and the outside is lengthwise scraped with the back of a knife or an edged shell or any other implement with a smooth surface so as to free the goods further from the residual slime, fat, etc., if any.

The gut is then turned inside out and the exposed inner surface is similarly scraped as above for removing all extraneous matters and then the whole is thoroughly washed by flushing with tap water at full pressure.

Chemical cleaning and bleaching

The mechanically cleansed and washed guts are handled for 4 hours with intermittent stirring in a hundred lb. solution made up as follows:

| | Pounds |
|---|---|
| Ordinary washing soap | ½ |
| Sodium bicarbonate | ½ |
| Water | 99 |

The goods are next taken out and put in a fresh bath of the same composition and retained in the fresh bath overnight (16 hours).

The following day the goods are again washed three times in clean water for a total period of at least 3 hours and are then put in hundred lbs. of a protected bleaching bath made up as follows:

| | |
|---|---|
| Hydrogen peroxide (100 vol.) ml./litre | 15–20 |
| Magnesium sulphate gms./litre | 10 |
| A non-ionic sulphated fatty alcohol (of the type Triton X–100 [iso-octylphenyl polyethoxy ethanol gm./litre | 0.5 |

The pH of the liquor is adjusted to 9–10 by adding 1 gm. per litre of sod. carbonate, sod. bicarbonate or sod. hydroxide.

The goods are kept in the bath for 1–3 days until thoroughly cleaned and bleached. The bath is reinforced (particularly hydrogen peroxide) at intervals say once a day.

Other chemical treatments

The chemically cleansed and bleached goods are thoroughly washed in 4 or 5 changes of clean water and then treated in a dilute acetic acid bath containing 5 ml. per litre of glacial acetic acid for 1–10 minutes.

The goods are again washed in three changes of water and then treated for 15 minutes in an emulsion of groundnut oil and glycerine each being present to the extent of 20 ml./litre.

Next the goods are thoroughly drained and then inflated and dried before being packed suitably as per the requirement of the customer.

Thus a clean dry to soak product of greatly improved appearance and suitable for use as sausage casing and for making surgical sutures, sports guts, musical instrument strings and the like is obtained.

EXAMPLE 2

As in Example 1, except that the goods and the treatment liquors are taken on volume basis as follows:

10 vols. of cattle intestines are treated in 100 vols. (10 times the vol. of goods) of a water solution made up with—

| | Percent |
|---|---|
| Ordinary washing soap | ½ |
| Sodium bicarbonate | ½ |

Similarly, 10 vols. of cattle intestines are treated in 100 vols. (10 times the vol. of goods) of an aqueous protected bleaching solution made up as follows:

| | |
|---|---|
| Hydrogen peroxide (100 vol.) ml./litre | 15–20 |
| Magnesium sulphate gms./litre | 10 |
| Non-ionic fatty alcohol (of the type Triton X–100 [iso-octylphenyl polyethoxy ethanol]) gm. | 0.5 |

The pH of the liquor is adjusted to 9–10 by adding 1 gm. per litre of sod. carbonate, sod. bicarbonate or sod. hydroxide.

EXAMPLE 3

As is Examples 1 and 2, except that the starting material consists of intestines of smaller animals like goat, sheep, or pig.

The goods being derived from smaller animals the duration of treatment both in the chemical cleaning and bleaching liquors may be in general, curtailed correspondingly in keeping with the result obtained except in case of goods of high fat content.

The end-products have a softer and more silky feel than in the case of intestines of larger animals.

EXAMPLE 4

As in Examples 1, 2, 3, except that the ingredients used in the chemical cleaning and bleaching and other chemical treatments may be increased or decreased within the range ±50 percent of the quantities given in the above examples. In such cases, goods otherwise found to be reasonably satisfactory may exhibit loss of strength or a less attractive appearance than the goods obtained as per processing in the foregoing examples.

EXAMPLE 5

As in Examples 1 to 4, except that the pH of the bleaching bath may be first brought to an acid range of 3–7 with the help of a suitable acid strong or weak like sulphuric, hydrochloric, oxalic, lactic, formic, etc., or an acid salt like their ammonium salts to be followed by bleaching in the fresh alkaline bath as given in the above examples alternating such treatments several times, if necessary.

Since the processing is simple and can be effected also without the aid of machinery, it is amenable to universal adoption, thus rendering it possible to utilise the intestines to a much greater extent than hitherto possible. All the raw material can be readily processed and stored indefinitely in anticipation of demand and can be easily dispatched by air to any place, whenever required. This is a novel line of development and is expected to lead to a complete change in the conventional pattern of the concerned trade and industry.

What I claim is:

1. A method of processing raw intestines consisting of the following steps:
   (1) Mechanically washing and scraping said intestines;
   (2) Cleaning said intestines consecutively in two baths of an aqueous solution containing ¼–¾% soap and ¼–¾% soda, said intestines being retained in said first bath for four hours and said second bath for sixteen hours;
   (3) Bleaching the cleaned intestines for a period of one to three days in an aqueous solution consisting of 15–20 ml. per liter of hydrogen peroxide, 5–15 gm. per liter of magnesium sulphate, .25–.75 gm. per liter of a nonionic sulphated fatty alcohol and an alkali selected from the group consisting of sodium hydroxide, sodium carbonate and sodium bicarbonate in an amount sufficient to maintain said solution at a pH between 9 and 10;
   (4) Thoroughly washing said intestines with water;
   (5) Treating the bleached intestines for a period of one to ten minutes in an aqueous solution containing 2.5–7.5 ml. per liter of dilute acetic acid;
   (6) Thoroughly washing said intestines with water;
   (7) Treating the acid-treated intestines in an emulsion consisting of 10–30 ml. per liter of groundnut oil and 10–30 ml. per liter of glycerine for a period of about fifteen minutes.
   (8) Inflating and drying said intestines.

2. A method of processing raw intestines consisting of the following steps:
   (1) Mechanically washing and scraping said intestines;
   (2) Cleaning said intestines consecutively in two baths of an aqueous solution containing ½–¾% soap and ½–¾% soda, said intestines being retained in said first bath for four hours and said second bath for sixteen hours;
   (3) Bleaching the cleaned intestines for a period of one to three days in an aqueous solution consisting of 15–20 ml. per liter of hydrogen peroxide, 10 gm. per liter of magnesium sulphate, .5 gm. per liter of nonionic sulphated fatty alcohol and an alkali selected from the group consisting of sodium hydroxide, sodium carbonate and sodium bicarbonate in an amount sufficient to maintain said solution at a pH between 9 and 10;
   (4) Thoroughly washing said intestines with water;
   (5) Treating the bleached intestines for a period of one to ten minutes in an aqueous solution containing 5 ml. per liter of dilute acetic acid;
   (6) Thoroughly washing said intestines with water;
   (7) Treating the acid-treated intestines in an emulsion consisting of 20 ml. per liter of groundnut oil and 20 ml. per liter of glycerine for a period of about fifteen minutes.
   (8) Inflating and drying said intestines.

References Cited

UNITED STATES PATENTS

| | | | |
|---|---|---|---|
| 2,062,489 | 12/1936 | Adams | 99—175 |
| 2,314,313 | 3/1943 | Rinehart | 99—175 |
| 2,360,374 | 10/1944 | Topjian | 99—175 X |
| 2,460,077 | 1/1949 | Ernest | 99—175 X |
| 2,482,731 | 9/1949 | Gomeck | 99—175 |
| 2,966,415 | 12/1960 | Rinehart et al. | 99—175 |
| 3,025,166 | 3/1962 | Smith | 99—175 X |
| 3,123,653 | 3/1964 | Lieberman | 99—175 |

OTHER REFERENCES

Gerrad: "Sausage and Small Goods Production," 1960, published by Leonard Hill Limited, London, pages 74 to 77, inclusive.

HYMAN LORD, *Primary Examiner.*